US012353026B2

(12) United States Patent
Murray et al.

(10) Patent No.: US 12,353,026 B2
(45) Date of Patent: *Jul. 8, 2025

(54) FIBER OPTIC CONNECTOR

(71) Applicants: COMMSCOPE CONNECTIVITY UK LIMITED, Wiltshire (GB); CommScope Telecommunications (Shanghai) Co. Ltd., Shanghai (CN)

(72) Inventors: David Patrick Murray, Bristol (GB); Chris Charles Taylor, Cheltenham Glos (GB); Gordon John White, Gloucester (GB); Zhaoyang Tong, Shanghai (CN); Lei Liu, Shanghai (CN)

(73) Assignees: CommScope Connectivity UK Limited, Swindon (GB); CommScope Telecommunications (Shanghai) Co. Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,634

(22) Filed: Mar. 13, 2023

(65) Prior Publication Data
US 2023/0280544 A1 Sep. 7, 2023

Related U.S. Application Data

(63) Continuation of application No. 17/390,517, filed on Jul. 30, 2021, now Pat. No. 11,604,319, which is a
(Continued)

(51) Int. Cl.
*G02B 6/36* (2006.01)
*G02B 6/38* (2006.01)

(52) U.S. Cl.
CPC ........... *G02B 6/389* (2013.01); *G02B 6/3825* (2013.01); *G02B 6/3831* (2013.01); *G02B 6/387* (2013.01);
(Continued)

(58) Field of Classification Search
CPC .... G02B 6/389; G02B 6/3825; G02B 6/3831; G02B 6/387; G02B 6/3879; G02B 6/3885; G02B 6/3893; G02B 6/36
See application file for complete search history.

(56) References Cited

U.S. PATENT DOCUMENTS

| | | | |
|---|---|---|---|
| 5,011,424 | A | 4/1991 | Simmons |
| 5,090,916 | A | 2/1992 | Magnier |

(Continued)

FOREIGN PATENT DOCUMENTS

| | | | |
|---|---|---|---|
| CN | 2513249 Y | 9/2002 | |
| CN | 1658441 A | 8/2005 | |

(Continued)

OTHER PUBLICATIONS

International Search Report for International Application No. PCT/IB2013/051329 mailed Jun. 13, 2013 (2 pages).

(Continued)

*Primary Examiner* — Jennifer Doan
(74) *Attorney, Agent, or Firm* — Merchant & Gould P.C.

(57) ABSTRACT

A connector including two connector portions each including a ferrule and a latch, each latch including a distal end, and a proximal end, wherein the latch is pivotable about an intermediate connection portion; and a boot mounted to the connector portions, the boot movable longitudinally relative to the connector portions, wherein the boot causes the distal ends of the latch to pivot toward the ferrule of each connector portion as the boot is moved away from the connector portions. Front housings of the connector portions can each be rotated about the longitudinal axis of the ferrule without rotating the ferrule or the boot, to change the polarity of the two connector portions. The spacing between the two ferrules is adjustable. A holder holds the connector portions, the holder including side slots, the connector portions mounted to the holder by moving laterally to the side slots. The holder
(Continued)

defines an area for receipt of a fiber optic cable when the ferrule is pushed in a direction toward the boot.

9 Claims, 17 Drawing Sheets

Related U.S. Application Data continuation of application No. 16/720,447, filed on Dec. 19, 2019, now Pat. No. 11,079,556, which is a continuation of application No. 16/107,754, filed on Aug. 21, 2018, now Pat. No. 10,545,296, which is a continuation of application No. 15/111,415, filed as application No. PCT/CN2014/070514 on Jan. 13, 2014, now Pat. No. 10,067,301.

(52) U.S. Cl.
CPC ......... *G02B 6/3879* (2013.01); *G02B 6/3885* (2013.01); *G02B 6/3893* (2013.01)

(56) References Cited

U.S. PATENT DOCUMENTS

| | | |
|---|---|---|
| 5,123,071 A | 6/1992 | Mullholland et al. |
| 5,211,572 A | 5/1993 | Comstock et al. |
| 5,315,679 A | 5/1994 | Baldwin et al. |
| 5,335,301 A | 8/1994 | Newman et al. |
| 5,462,457 A | 10/1995 | Schroepfer et al. |
| 5,481,634 A | 1/1996 | Anderson et al. |
| 5,574,812 A | 11/1996 | Beier et al. |
| 5,579,425 A | 11/1996 | Lampert et al. |
| 5,638,474 A | 6/1997 | Lampert et al. |
| 5,651,690 A | 7/1997 | Klas et al. |
| 5,675,682 A | 10/1997 | De Marchi |
| 6,024,498 A | 2/2000 | Carlisle et al. |
| 6,076,974 A | 6/2000 | Carlisle et al. |
| 6,164,835 A | 12/2000 | Imasaki |
| 6,196,733 B1 | 3/2001 | Wild et al. |
| 6,250,817 B1 | 6/2001 | Lampert et al. |
| 6,250,942 B1 | 6/2001 | Lemke et al. |
| 6,250,949 B1 | 6/2001 | Lin |
| 6,254,418 B1 | 7/2001 | Tharp et al. |
| 6,276,839 B1 | 8/2001 | De Marchi |
| 6,325,547 B1 | 12/2001 | Cammons |
| 6,357,934 B1 | 3/2002 | Discoll |
| 6,364,685 B1 | 4/2002 | Manning |
| 6,409,392 B1 | 6/2002 | Lampert et al. |
| 6,435,732 B1 | 8/2002 | Asao |
| 6,443,627 B1 | 9/2002 | Anderson et al. |
| 6,447,170 B1 | 9/2002 | Takahashi et al. |
| 6,565,262 B2 | 5/2003 | Childers et al. |
| 6,692,289 B2 | 2/2004 | Nemoto |
| 6,776,645 B2 | 8/2004 | Roth et al. |
| 6,848,836 B2 | 2/2005 | Ueda et al. |
| 6,863,556 B2 | 3/2005 | Viklund et al. |
| 6,885,560 B2 | 4/2005 | Zaremba |
| 6,994,580 B1 | 2/2006 | Chen et al. |
| 7,018,108 B2 | 3/2006 | Makhlin et al. |
| 7,037,129 B2 | 5/2006 | Lo et al. |
| 7,052,186 B1 | 5/2006 | Bates |
| 7,101,212 B1 | 9/2006 | Larkin |
| 7,163,414 B2 | 1/2007 | Lo et al. |
| 7,281,938 B1 | 10/2007 | Wu |
| 7,297,013 B2 | 11/2007 | Caveney et al. |
| 7,326,075 B1 | 2/2008 | Armstrong et al. |
| 7,329,137 B2 | 2/2008 | Martin et al. |
| 7,341,383 B2 | 3/2008 | Droege et al. |
| 7,354,292 B1 | 4/2008 | Lloyd et al. |
| 7,413,473 B2 | 8/2008 | Wu |
| 7,421,181 B2 | 9/2008 | Kanou et al. |
| 7,425,159 B2 | 9/2008 | Lin |
| 7,440,670 B2 | 10/2008 | Kanou et al. |
| 7,445,484 B2 | 11/2008 | Wu |
| 7,465,180 B2 | 12/2008 | Kusada et al. |
| 7,500,790 B2 | 3/2009 | Erdman et al. |
| 7,534,125 B1 | 5/2009 | Schroll |
| 7,534,128 B2 | 5/2009 | Caveney et al. |
| 7,549,888 B1 | 6/2009 | Armstrong et al. |
| 7,588,373 B1 | 9/2009 | Sato et al. |
| 7,594,766 B1 | 9/2009 | Sasser et al. |
| 7,632,125 B2 | 12/2009 | Irwin et al. |
| 7,641,398 B2 | 1/2010 | O'Riorden et al. |
| 7,651,361 B2 | 1/2010 | Henry et al. |
| 7,666,023 B2 | 2/2010 | Wu |
| 7,690,939 B2 | 4/2010 | Wu |
| 7,736,171 B2 | 6/2010 | Reed et al. |
| 7,744,288 B2 | 6/2010 | Lu et al. |
| 7,753,710 B2 | 7/2010 | George |
| 7,771,225 B1 | 8/2010 | Wu |
| 7,892,012 B1 | 2/2011 | Foung |
| 7,997,806 B2 | 8/2011 | Nakagawa |
| 8,043,013 B2 | 10/2011 | Lichoulas et al. |
| 8,152,384 B2 | 4/2012 | De Jong et al. |
| 8,152,385 B2 | 4/2012 | De Jong et al. |
| 8,187,018 B2 | 5/2012 | Kosugi |
| 8,221,007 B2 | 7/2012 | Peterhans et al. |
| 8,235,745 B1 | 8/2012 | Armstrong et al. |
| 8,267,712 B2 | 9/2012 | Huang et al. |
| 8,317,408 B2 | 11/2012 | Nakagawa |
| 8,317,532 B2 | 11/2012 | Kosugi |
| 8,382,506 B2 | 2/2013 | Reed et al. |
| 8,465,317 B2 | 6/2013 | Giniadek et al. |
| 8,506,174 B2 | 8/2013 | Nakagawa |
| 8,556,645 B2 | 10/2013 | Crain |
| 8,678,669 B2 | 3/2014 | Lee |
| 8,690,593 B2 | 4/2014 | Anderson et al. |
| 8,747,141 B2 | 6/2014 | Crain |
| 8,753,022 B2 | 6/2014 | Schroeder et al. |
| 8,764,308 B2 | 7/2014 | Irwin et al. |
| 8,770,863 B2 | 7/2014 | Cooke et al. |
| 8,864,390 B2 | 10/2014 | Chen et al. |
| 8,870,466 B2 | 10/2014 | Lu |
| 8,876,403 B2 | 11/2014 | Katoh |
| 8,979,569 B2 | 3/2015 | Aekins |
| 8,989,541 B2 | 3/2015 | Zimmel |
| 8,998,505 B2 | 4/2015 | Motofuji |
| 9,246,262 B2 | 1/2016 | Brown et al. |
| 9,448,370 B2 | 9/2016 | Xue et al. |
| 9,557,495 B2 | 1/2017 | Raven et al. |
| 9,570,852 B2 | 2/2017 | Plamondon et al. |
| 9,595,786 B1 | 3/2017 | Takano et al. |
| 9,599,778 B2 | 3/2017 | Wong et al. |
| 9,678,283 B1 | 6/2017 | Chang et al. |
| 9,739,955 B2 | 8/2017 | Lee |
| 9,761,998 B2 | 9/2017 | De Dios Martin et al. |
| 9,825,403 B2 | 11/2017 | De Dios Martin et al. |
| 9,829,650 B2 | 11/2017 | Irwin et al. |
| 9,829,657 B2 | 11/2017 | Lee |
| 9,869,825 B2 | 1/2018 | Bailey et al. |
| 9,927,582 B2 | 3/2018 | Chang et al. |
| 9,933,584 B2 | 4/2018 | Lin |
| 9,958,621 B2 | 5/2018 | Wong et al. |
| 9,991,635 B2 | 6/2018 | De Dios Martin et al. |
| 10,054,747 B2 | 8/2018 | Lee |
| 10,067,301 B2 | 9/2018 | Murray et al. |
| 10,158,194 B2 | 12/2018 | Takano et al. |
| 10,228,516 B2 | 3/2019 | Veatch et al. |
| 10,288,819 B2 | 5/2019 | Chang et al. |
| 10,520,690 B2 | 12/2019 | Takano et al. |
| 10,545,296 B2 | 1/2020 | Murray et al. |
| 10,585,247 B2 | 3/2020 | Takano et al. |
| 10,620,384 B2 | 4/2020 | Iizumi et al. |
| 10,663,676 B2 | 5/2020 | Takano et al. |
| 10,712,512 B2 | 7/2020 | Ho et al. |
| 10,830,963 B2 * | 11/2020 | Elenbaas .............. G02B 6/3871 |
| 10,928,594 B2 | 2/2021 | Iizumi et al. |
| 11,079,556 B2 | 8/2021 | Murray et al. |
| 11,322,889 B2 | 5/2022 | De Dios Martin et al. |
| 11,604,319 B2 | 3/2023 | Murray et al. |
| 11,742,617 B2 | 8/2023 | De Dios Martin et al. |
| 2002/0090177 A1 | 7/2002 | Anderson |
| 2003/0017729 A1 | 1/2003 | Huang |

(56) References Cited

U.S. PATENT DOCUMENTS

| | | |
|---|---|---|
| 2003/0220008 A1 | 11/2003 | Viklund et al. |
| 2003/0220080 A1 | 11/2003 | Chuberre et al. |
| 2003/0220081 A1 | 11/2003 | Dykstra et al. |
| 2003/0220082 A1 | 11/2003 | Yoshida |
| 2003/0220083 A1 | 11/2003 | Lee et al. |
| 2003/0220084 A1 | 11/2003 | Makarov et al. |
| 2003/0220085 A1 | 11/2003 | Kawand |
| 2003/0220086 A1 | 11/2003 | Birkett |
| 2003/0220087 A1 | 11/2003 | Suhonen |
| 2003/0220088 A1 | 11/2003 | Cowley et al. |
| 2003/0220089 A1 | 11/2003 | Change et al. |
| 2003/0222008 A1 | 12/2003 | Nightlinger et al. |
| 2004/0247252 A1 | 12/2004 | Ehrenreigh |
| 2005/0054230 A1 | 3/2005 | Huang |
| 2005/0058404 A1 | 3/2005 | Ngo |
| 2005/0101178 A1 | 5/2005 | Patterson |
| 2005/0124201 A1 | 6/2005 | Lo et al. |
| 2006/0049826 A1 | 3/2006 | Daneman et al. |
| 2006/0089039 A1 | 4/2006 | Caveney |
| 2006/0276071 A1 | 12/2006 | Rossi |
| 2007/0049082 A1 | 3/2007 | Wu |
| 2007/0077806 A1 | 4/2007 | Martin et al. |
| 2007/0140621 A1 | 6/2007 | Decusatis et al. |
| 2007/0232118 A1 | 10/2007 | Wu |
| 2007/0298636 A1 | 12/2007 | Kusada et al. |
| 2008/0030220 A1 | 2/2008 | Agarwal et al. |
| 2008/0226237 A1 | 9/2008 | O'Riorden et al. |
| 2009/0042424 A1 | 2/2009 | Kaneda |
| 2009/0047818 A1 | 2/2009 | Irwin et al. |
| 2009/0245732 A1 | 10/2009 | Murano |
| 2010/0216325 A1 | 8/2010 | Huang |
| 2010/0220961 A1* | 9/2010 | de Jong ............ G02B 6/38875 385/77 |
| 2011/0058773 A1 | 3/2011 | Peterhans et al. |
| 2011/0081113 A1 | 4/2011 | Jones |
| 2011/0091159 A1 | 4/2011 | De Jong et al. |
| 2011/0123157 A1 | 5/2011 | Belsan et al. |
| 2011/0183541 A1 | 7/2011 | Kosugi |
| 2011/0217008 A1 | 9/2011 | Cline et al. |
| 2011/0299814 A1 | 12/2011 | Nakagawa |
| 2012/0057826 A1 | 3/2012 | Katoh |
| 2012/0155810 A1 | 6/2012 | Nakagawa |
| 2012/0208388 A1 | 8/2012 | Kosugi |
| 2012/0213478 A1 | 8/2012 | Chen et al. |
| 2012/0308183 A1 | 12/2012 | Irwin et al. |
| 2013/0115794 A1 | 5/2013 | Chang et al. |
| 2013/0163934 A1 | 6/2013 | Lee et al. |
| 2013/0301994 A1 | 11/2013 | Motofuji |
| 2013/0323949 A1 | 12/2013 | De Dios Martin et al. |
| 2014/0141641 A1 | 5/2014 | De Dios Martin et al. |
| 2014/0169727 A1 | 6/2014 | Veatch et al. |
| 2015/0016780 A1 | 1/2015 | Skluzacek et al. |
| 2015/0036982 A1 | 2/2015 | Nhep et al. |
| 2016/0116685 A1 | 4/2016 | Wong et al. |
| 2016/0356962 A1 | 12/2016 | Moriyama et al. |
| 2017/0031109 A1 | 2/2017 | Meadowcroft et al. |
| 2017/0052330 A1 | 2/2017 | Lee |
| 2017/0192183 A1 | 7/2017 | Wong et al. |
| 2017/0307831 A1 | 10/2017 | Katagiyama et al. |
| 2018/0217339 A1 | 8/2018 | Ma et al. |
| 2018/0329158 A1 | 11/2018 | Chang et al. |
| 2019/0154922 A1 | 5/2019 | Elenbaas et al. |
| 2019/0243072 A1 | 8/2019 | Takano et al. |
| 2020/0064564 A1 | 2/2020 | Ho et al. |
| 2020/0081198 A1 | 3/2020 | Takano et al. |
| 2020/0241216 A1 | 7/2020 | Iizumi et al. |
| 2020/0379192 A1 | 12/2020 | Ho et al. |
| 2021/0132301 A1 | 5/2021 | Anderson et al. |
| 2021/0356677 A1 | 11/2021 | Murray et al. |
| 2022/0368074 A1 | 11/2022 | De Dios Martin et al. |
| 2023/0221500 A1* | 7/2023 | Elenbaas ............ G02B 6/3888 385/86 |
| 2023/0244041 A1 | 8/2023 | Royer et al. |
| 2023/0266539 A1 | 8/2023 | Wilson et al. |

FOREIGN PATENT DOCUMENTS

| | | |
|---|---|---|
| CN | 1770568 A | 5/2006 |
| CN | 101065888 A | 10/2007 |
| CN | 101133524 A | 2/2008 |
| CN | 101160696 A | 4/2008 |
| CN | 101313441 A | 11/2008 |
| CN | 102365568 A | 2/2012 |
| CN | 103091793 A | 5/2013 |
| CN | 203705688 U | 7/2014 |
| CN | 102749682 B | 5/2015 |
| CN | 103837939 B | 3/2017 |
| EP | 2337163 A1 | 6/2001 |
| EP | 1271706 A2 | 1/2003 |
| EP | 1653566 A1 | 5/2006 |
| EP | 1855360 A1 | 11/2007 |
| EP | 2063497 A1 | 5/2009 |
| EP | 2144100 A1 | 1/2010 |
| JP | S63-184271 A | 7/1988 |
| JP | 2003-526116 A | 9/2003 |
| JP | 2005-189288 A | 7/2005 |
| JP | 4278148 B2 | 6/2009 |
| JP | 2012-128341 A | 7/2012 |
| JP | 4995305 B2 | 8/2012 |
| JP | 5085694 B2 | 11/2012 |
| JP | 5275953 B2 | 5/2013 |
| KR | 10-2006-0016122 A | 2/2006 |
| KR | 10-1800506 B1 | 11/2017 |
| WO | 2004/065999 A2 | 8/2004 |
| WO | 2005/041363 A1 | 5/2005 |
| WO | 2006/047258 A1 | 5/2006 |
| WO | 2007/044310 A1 | 4/2007 |
| WO | 2009/135787 A1 | 11/2009 |
| WO | 2010/038283 A1 | 4/2010 |
| WO | 2012/054174 A | 8/2012 |
| WO | 2012/107439 A1 | 8/2012 |
| WO | 2012/107441 A1 | 8/2012 |
| WO | 2012/151175 A2 | 11/2012 |
| WO | 2013/124785 A1 | 5/2013 |
| WO | 2015/103783 A1 | 7/2015 |
| WO | 2018/226959 | 12/2018 |
| WO | 2021/243076 A1 | 12/2021 |

OTHER PUBLICATIONS

International Written Opinion for International Application No. PCT/IB2013/051329 mailed Jun. 13, 2013 (7 pages).

Chinese Office Action dated Jun. 18, 2015; CN Patent Appln. No. 201280017445.X; 5 pages.

Chinese Office Action dated May 22, 2015; CN Patent Appln. No. 201280017489.2; 7 pages.

International Search Report for International Application No. PCT/EP2012/052036 mailed Mar. 22, 2012. (2 pages).

International Search Report for International Application No. PCT/EP2012/052039 mailed May 31, 2012. (3 pages).

Spanish Search Report for corresponding application No. ES 201130169 mailed May 24, 2013 (with English Translation), 10 pages.

Spanish Search Report for application No. ES 201130168 mailed Jul. 1, 2013 (with English Translation); 8 pages.

Extended European Search Report for European Patent Application No. 14878059.6 mailed Aug. 9, 2017, 10 pages.

International Search Report for International Application No. PCT/CN2014/070514 mailed Oct. 22, 2014 (5 pages).

International Written Opinion for International Application No. PCT/CN2014/070514 mailed Oct. 22, 2014 (4 pages).

Extended European Search Report for European Patent Application No. 21170383.0 mailed Oct. 7, 2021 (11 pages).

LC Duplex Connectors, https://suncallamerica.com/products/lc-series/lc-duplex-connectors/, Suncall America Inc., 5 pages (Copyright 2019).

LC Push-Pull Uniboot Connectors, https://suncallamerica.com/products/lc-series/lc-push-pull-uniboot-connectors/, Suncall America Inc., 5 pages (Copyright 2019).

LC Uniboot Connectors, https://suncallamerica.com/products/lc-series/lc-uniboot-connectors/, Suncall America Inc., 4 pages (Copyright 2019).

(56) References Cited

OTHER PUBLICATIONS

International Search Report and Written Opinion for Application No. PCT/US2021/034612 mailed Sep. 15, 2021.
International Search Report and Written Opinion for Application No. PCT/US2022/023720 mailed Jul. 27, 2022.
Extended European Search Report for European Patent Application No. 21812515.1 mailed Jun. 14, 2024, 10 pages.
International Search Report and Written Opinion for Application No. PCT/US2023/062861 mailed Jun. 13, 2023.

* cited by examiner

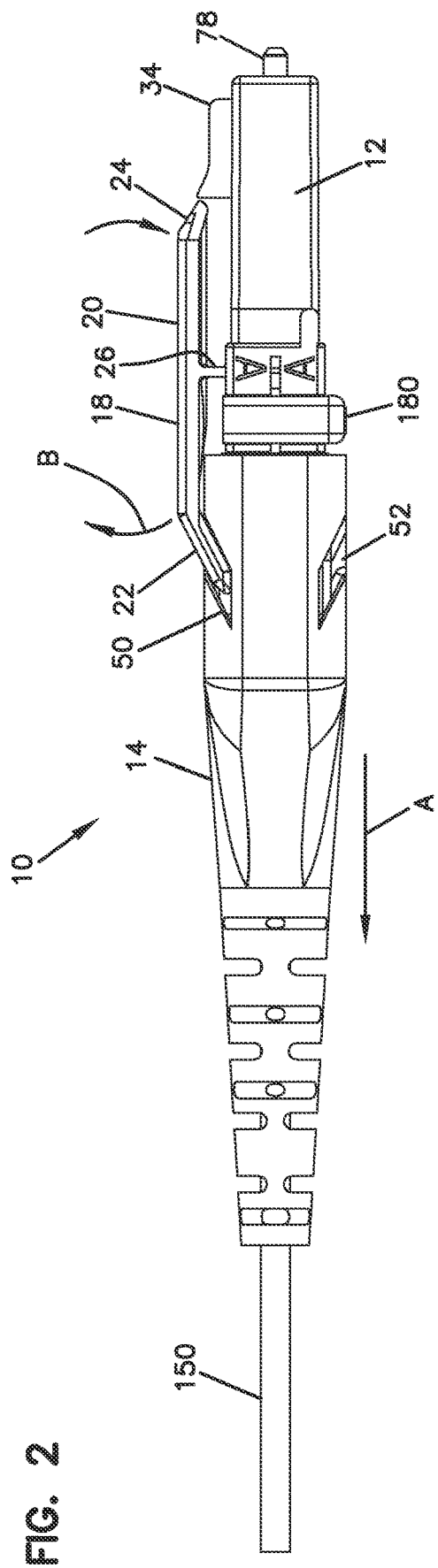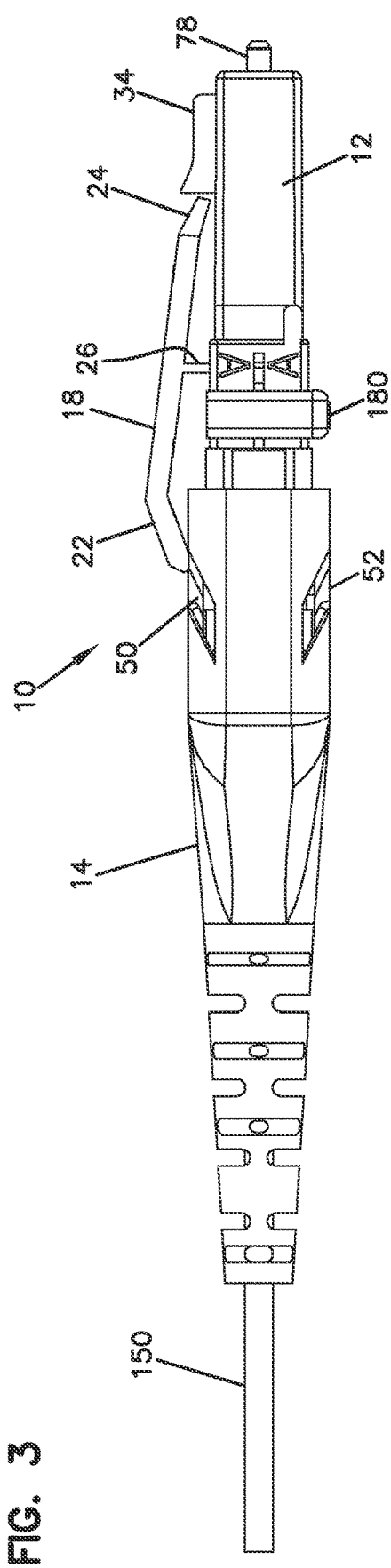

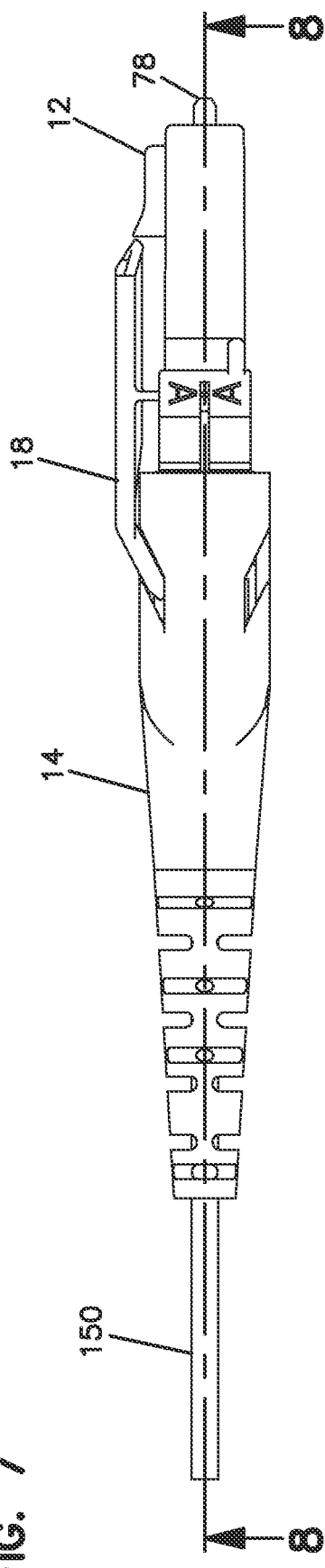
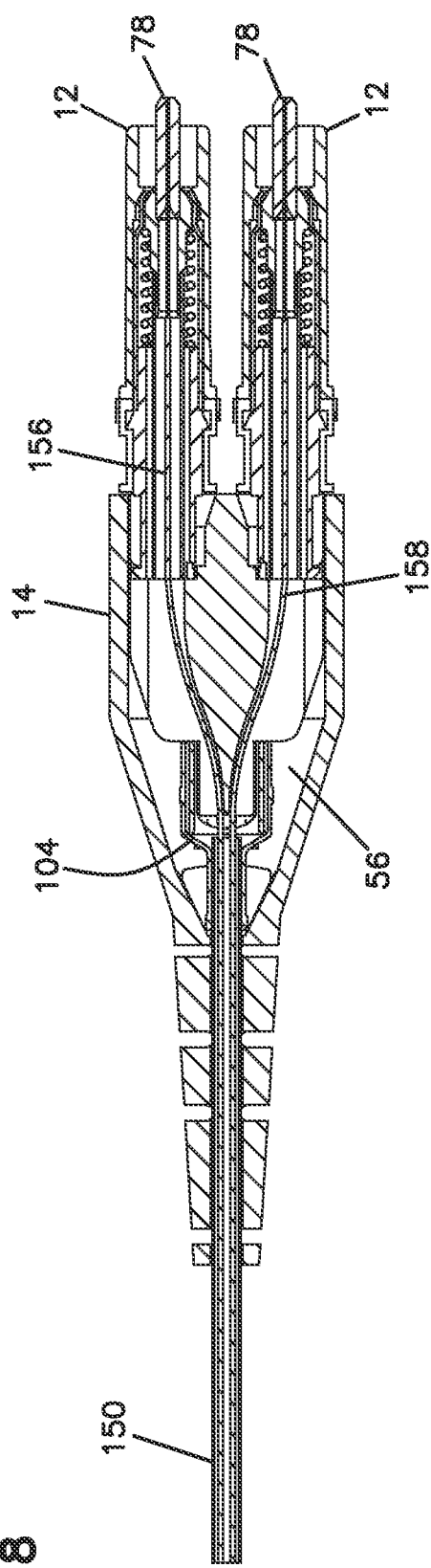
FIG. 7
FIG. 8

FIBER OPTIC CONNECTOR

This application is a Continuation of U.S. patent application Ser. No. 17/390,517, filed Jul. 30, 2021, now U.S. Pat. No. 11,604,319; which is a Continuation of U.S. patent application Ser. No. 16/720,447, filed on Dec. 19, 2019, now U.S. Pat. No. 11,079,556; which is a Continuation of U.S. patent application Ser. No. 16/107,754, filed on Aug. 21, 2018, now U.S. Pat. No. 10,545,296; which is a Continuation of U.S. patent application Ser. No. 15/111,415, filed on Jul. 13, 2016, now U.S. Pat. No. 10,067,301; which is a National Stage Application of PCT/CN2014/070514, filed on Jan. 13, 2014 and which applications are incorporated herein by reference. To the extent appropriate, a claim of priority is made to each of the above disclosed applications.

BACKGROUND

Modern optical devices and optical communications systems widely use fiber optic cables. A typical fiber optic cable includes one or more optical fibers contained within a protective jacket. Reinforcing structures such as aramid yarns and/or fiber reinforced epoxy rods can be used to provide reinforcement to the optical cables. It is well understood that a typical optical fiber includes a glass fiber processed so that light beams transmitted through the glass fiber are subject to total internal reflection wherein a large fraction of the incident intensity of light directed into the fiber is received at the other end of the fiber. A typical optical fiber includes a glass core surrounded by a cladding layer having a lower refractive index as compared to the refractive index of the core. The cladding causes light to be confined to the core by total internal reflection at the boundary between the two. The cladding layer of an optical fiber is often covered by one or more polymeric coatings (e.g., acrylate) to protect the glass and to facilitate handling of the optical fiber.

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a fusion splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule assembly includes a ferrule that functions to support an end portion of at least one optical fiber (in the case of a multi-fiber ferrule, the ends of multiple fibers are supported). The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter including an alignment sleeve that receives and coaxially aligns the ferrules of the fiber optic connectors desired to be interconnected. For certain styles of fiber optic connectors, the optical fibers are secured within their respective ferrules by a potting material such as epoxy.

SUMMARY

One aspect of the invention concerns a connector including two connector portions each including a ferrule and a latch, each latch including a distal end, and a proximal end, wherein the latch is pivotable about an intermediate connection portion; and a boot mounted to the connector portions, the boot movable longitudinally relative to the connector portions, wherein the boot causes the distal ends of the latch to pivot toward the ferrule of each connector portion as the boot is moved away from the connector portions.

In another aspect of the invention, front housings of the connector portions can each be rotated about the longitudinal axis of the ferrule without rotating the ferrule or the boot, to change the polarity of the two connector portions.

In a further aspect of the invention, the spacing between the two ferrules is adjustable.

In one example, a holder holds the connector portions, the holder including side slots, the connector portions mounted to the holder by moving laterally to the side slots.

The holder defines an area for receipt of a fiber optic cable when the ferrule is pushed in a direction toward the boot.

In one example, a ferrule assembly includes a ferrule, a hub and a spring. The ferrule assembly includes a front sleeve and rear sleeve which together hold the ferrule, hub and spring.

In a further example, a connector includes: a) two connector portions each including:
  i) a ferrule assembly including a ferrule and a hub mounted together, and a spring, the ferrule assembly including a front sleeve and a rear sleeve, the front and rear sleeves mounted together with the ferrule end protruding and the spring located in an interior area biasing the ferrule toward an extended position;
  ii) a front housing mounted to the ferrule assembly and including a latch, each latch including a distal end, and a proximal end, wherein the latch is pivotable about an intermediate connection portion, wherein the distal end includes a shoulder for mating with a latching shoulder of an adapter;

The connector further includes: b) a holder for holding the connector portions, the holder including side slots, the connector portions mounted to the holder by moving laterally to the side slots, the holder including a rearwardly projecting crimp support; and c) a boot mounted to the connector portions, the boot movable longitudinally relative to the connector portions, wherein the boot causes the distal ends of the latch to pivot toward the ferrule of each connector portion as the boot is moved away from the connector portions.

In one example, a clip holds the two connector portions at the desired spacing. The clip can be used to position the connector portions at one of at least two different spacings.

BRIEF DESCRIPTION OF THE DRAWINGS

FIG. 2 is a side view of the connector of FIG. 1 shown in the latched position.

FIG. 3 is a side view of the connector of FIG. 1 shown in the unlatched position.

FIG. 7 is a side view of the connector of FIG. 1.

FIG. 8 is a cross-sectional view of the connector of FIG. 7 taken along lines 8-8.

DETAILED DESCRIPTION

Figure 23:
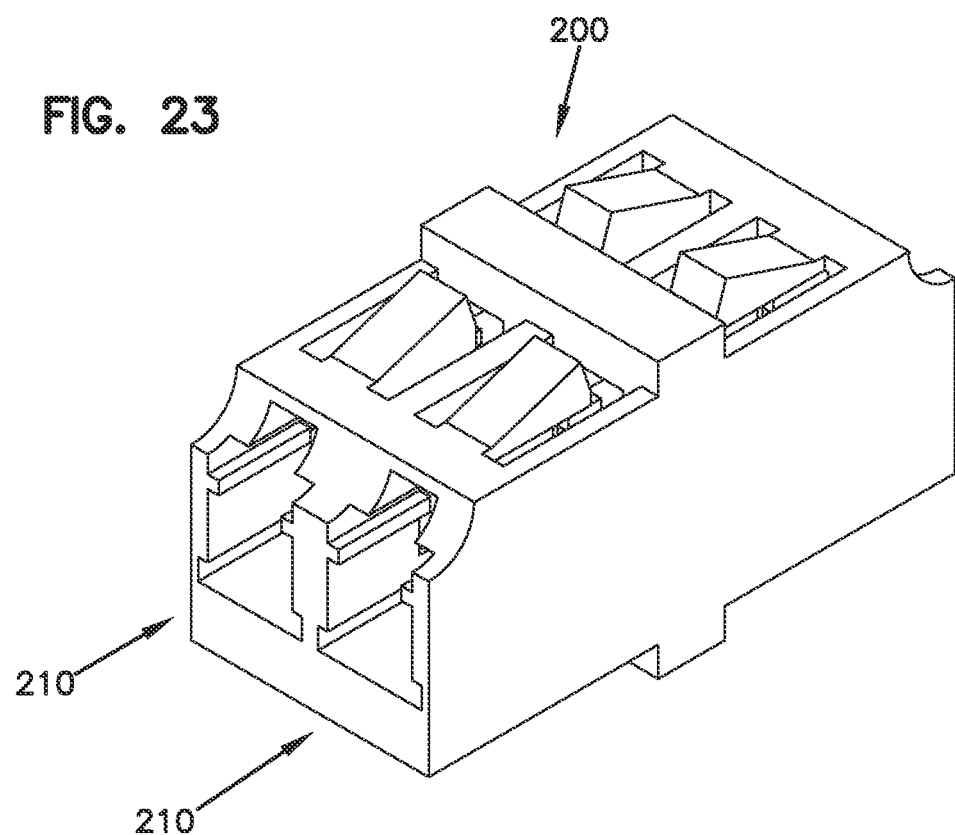
FIGS. 23 and 24 are two perspective views of a duplex adapter for mating with the connector of FIG. 1.
Figure 24:
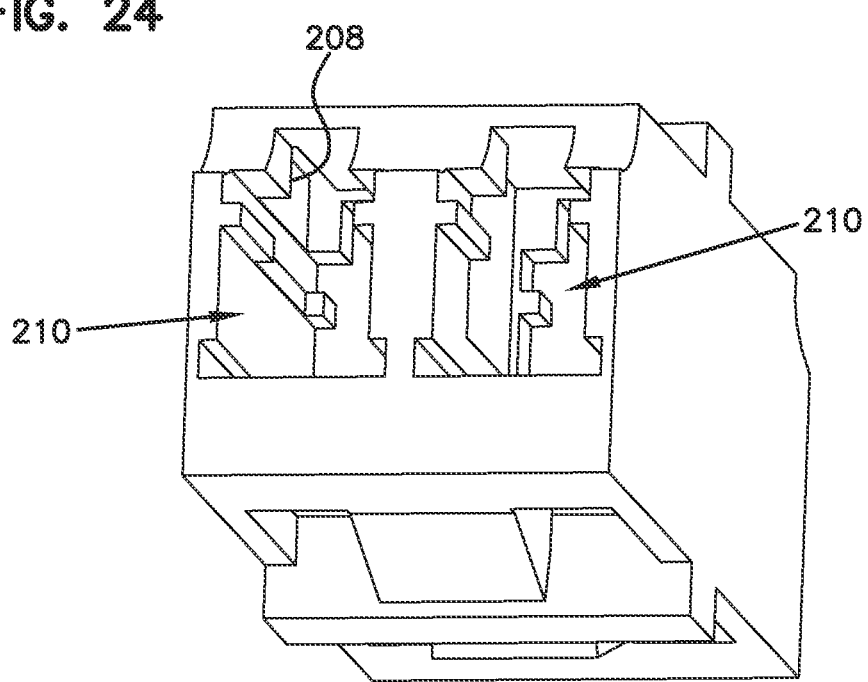
Figure 25:
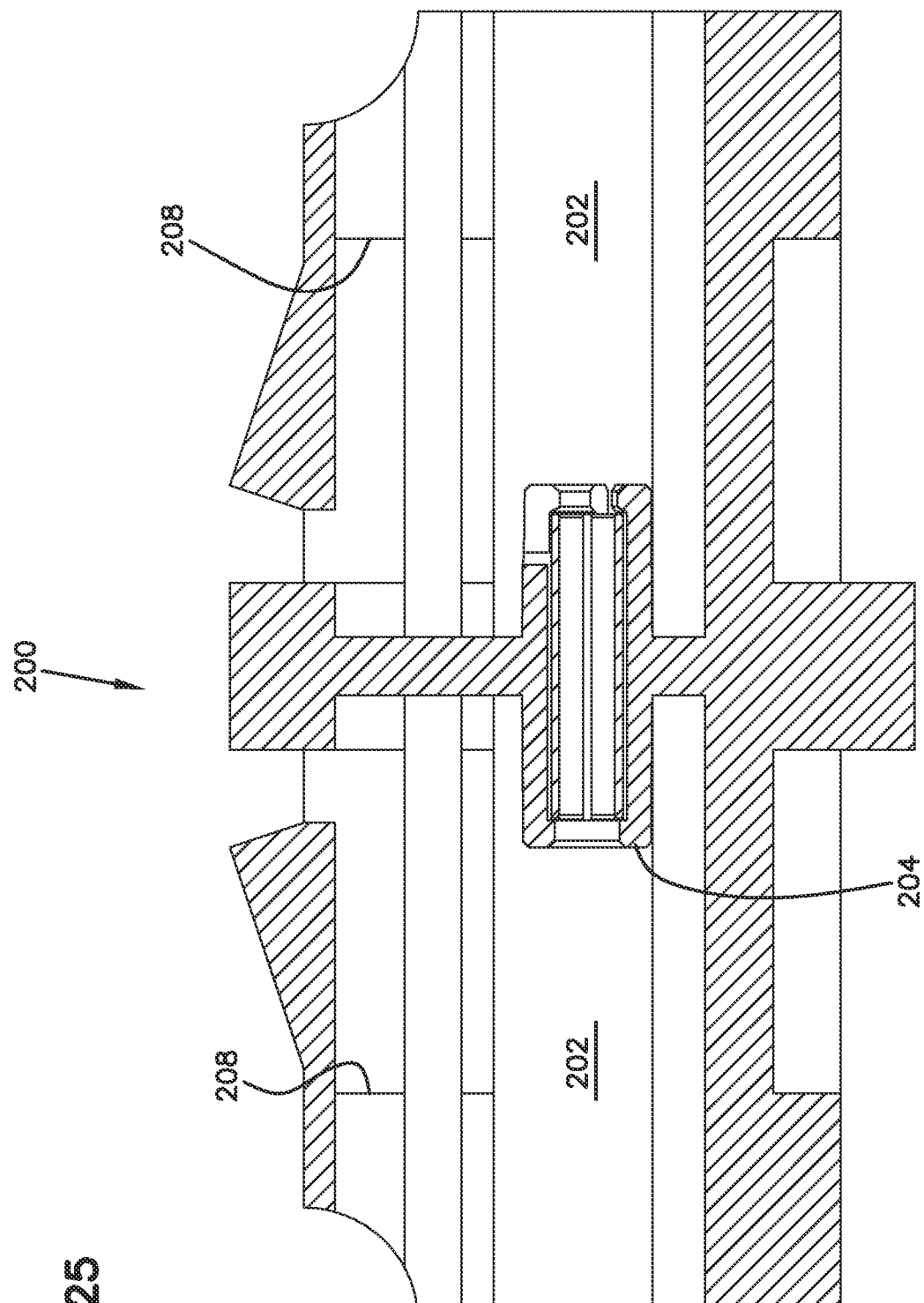
FIG. 25 is a cross-sectional view of the duplex adapter of FIGS. 23 and 24.

Referring now to FIGS. 1-22, an example connector 10 includes two fiber optic connector portions 12 and a boot 14. Connector portions 12 each include a ferrule 78 for holding a fiber optic cable. Connector 10 may also be referred to as duplex connector assembly or duplex connector. Connector 10 is matable to an adapter 200 shown in FIGS. 23-25. Adapter 200 mates two connectors 10 together or mates another connector to connector 10 for fiber optic signal transmission.

The two connector portions 12 of connector 10 are arranged in a parallel position. Each connector portion 12 has a latch 18 including a latch body 20 with a proximal end 22 and a distal end 24. Latch 18 pivots around a connection point 26 during latching and unlatching of latch 18. Latch 18 secures connector 10 to adapter 200. Boot 14 is movable away from connector portions 12 in a longitudinal direction (Direction A in FIG. 2) causing pivoting movement of latch 18 about connection point 26 (Direction B in FIG. 2). Such pivoting movement allows for unlatching of connector portions 12 from adapter 200. Boot 14 simultaneously moves both latches 18 to allow for connector 10 to be unlatched from a duplex adapter or adapters with side-by-side ports 210. Latch body 20 includes a shoulder 28 which mates with latching shoulder 208 of adapter 200 to secure the connector 10 to the adapter 200.

In the illustrated embodiment, each connector portion 12 defines an LC profile, meaning that the connector portion 12 can mate with an LC adapter.

Boot 14 includes slots 50 which receive distal ends 24 of latch 18. Slots 50 and proximal ends 22 are angled so as to cause a lifting motion for proximal ends 22 which results in a downward movement of distal ends 24 of latch 18 when boot 14 is pulled longitudinally away from a remainder of connector 10. Compare FIGS. 2 and 3. A user can pull on boot 14 in a longitudinal direction away from the ferrules, and remove the connector 10 from the adapter 200, without directly engaging latches 18.

Connector portion 12 includes a front housing 32 and a ferrule assembly 76. Ferrule assembly 76 includes a ferrule 78, a hub 80 which holds the ferrule 78, and a spring 82 which biases hub 80 and ferrule 78 toward front housing 32. A front sleeve 88 and a rear sleeve 90 are mounted together with the ferrule 78, the hub 80, and the spring 82 housed inside to form the ferrule assembly 76. An internal tube 84 is provided extending from the hub 80. Tube 84 prevents epoxy from interfering with the movement of the ferrule 78, the hub 80 and the spring 82. The rear sleeve 90 is received in holder 96 through a side slot 98. A rear crimp ring 104 and a crimp sleeve 106 allow crimping of a cable 150 to holder 96.

Figure 1:
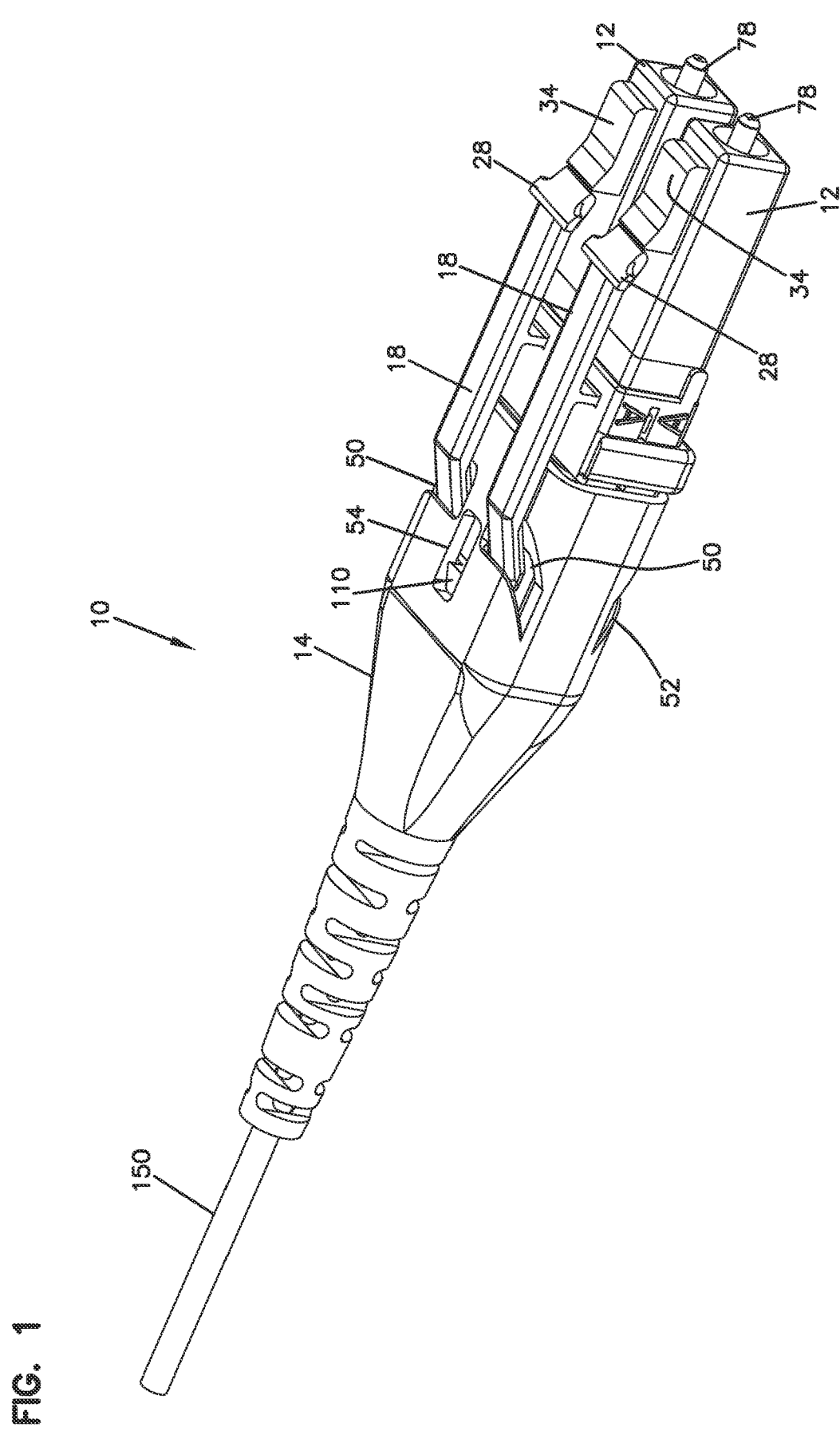
FIG. 1 is a perspective view of one example fiber optic connector in accordance with aspects of the present invention.
Figure 4:
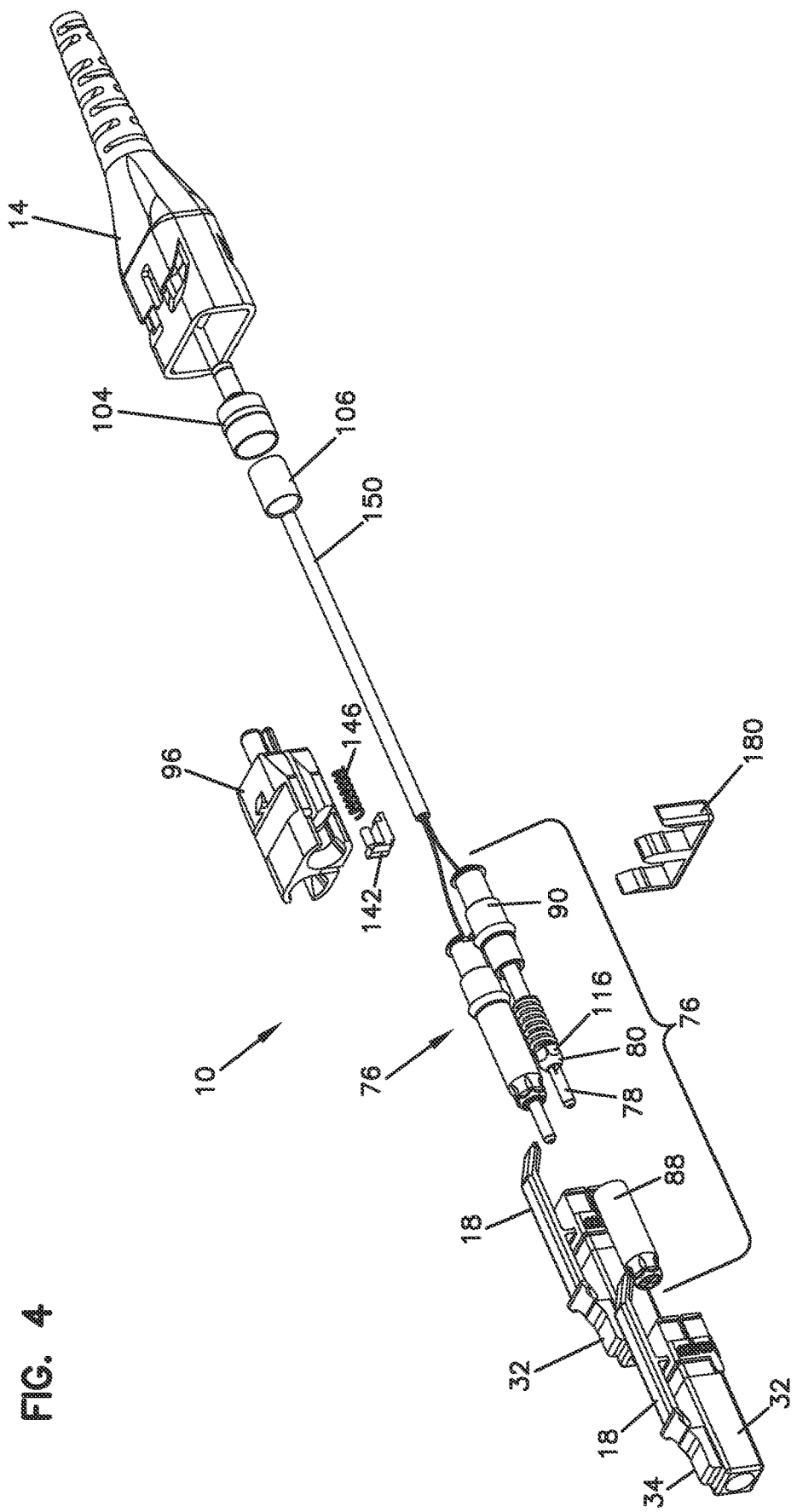
FIG. 4 is an exploded perspective view of the connector of FIG. 1.
Figure 5:
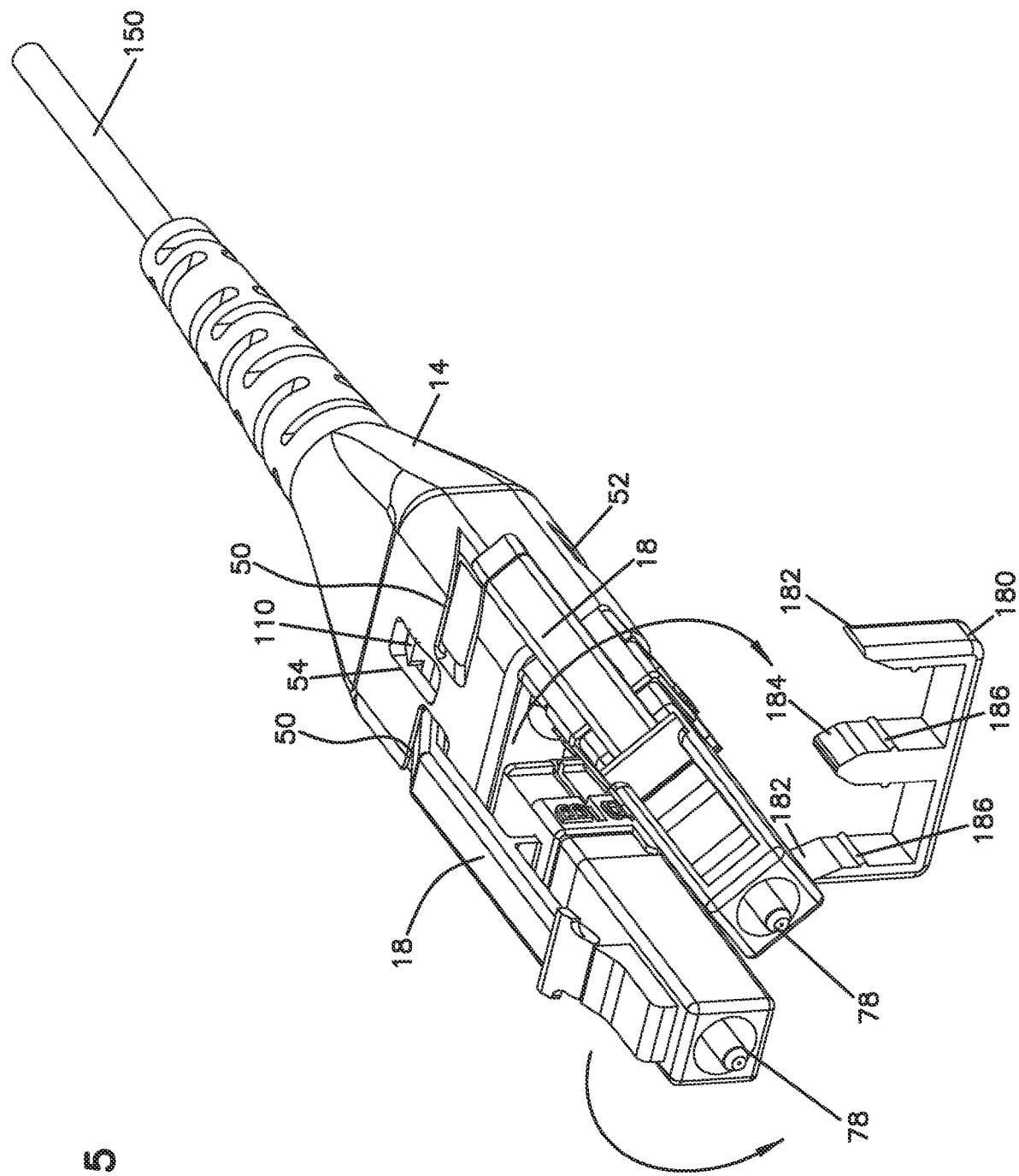
FIG. 5 is a perspective view of the connector, showing the front housings of the connector portions being rotated to change the polarity of the connector.
Figure 6:
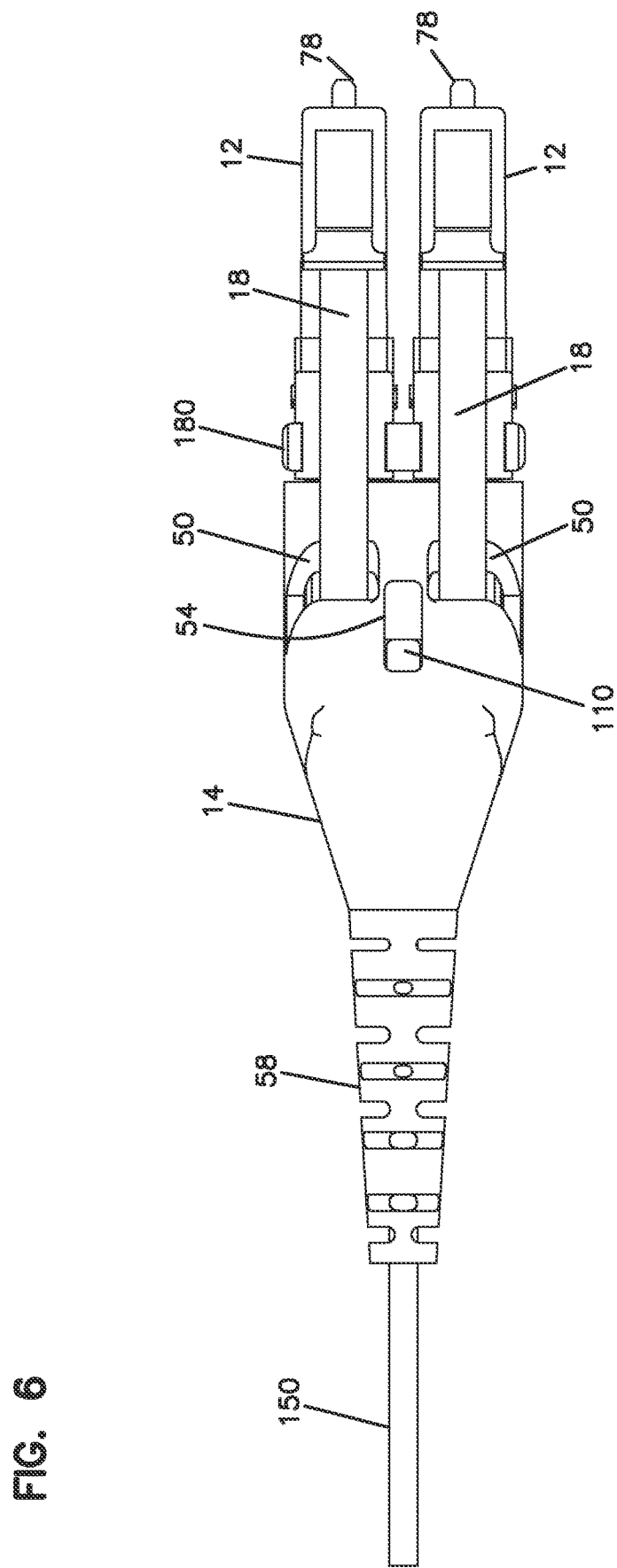
FIG. 6 is a top view of the connector of FIG. 1.
Figure 9:
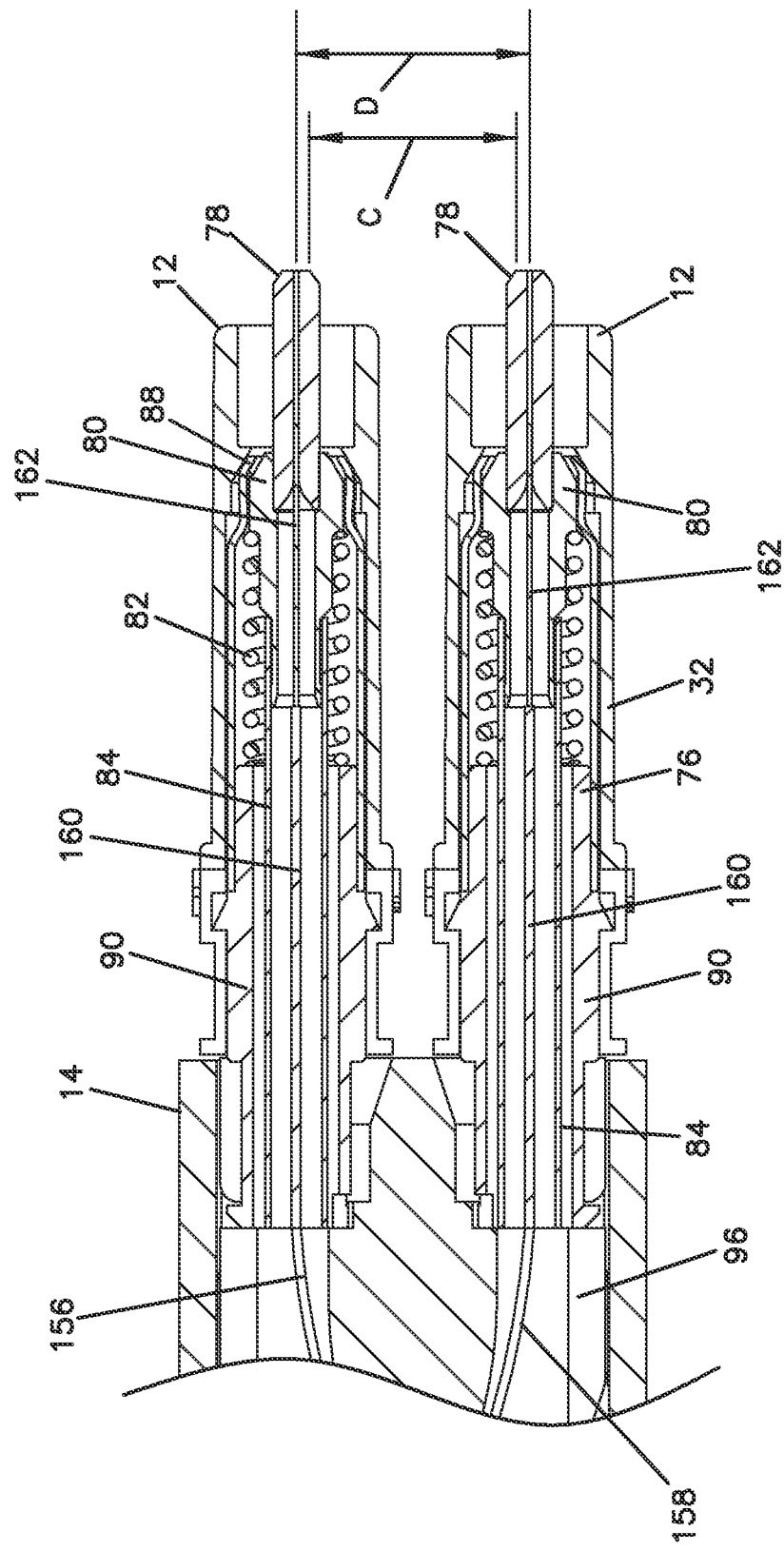
FIG. 9 is an enlarged view of a front portion of the connector of FIG. 8.
Figure 10:
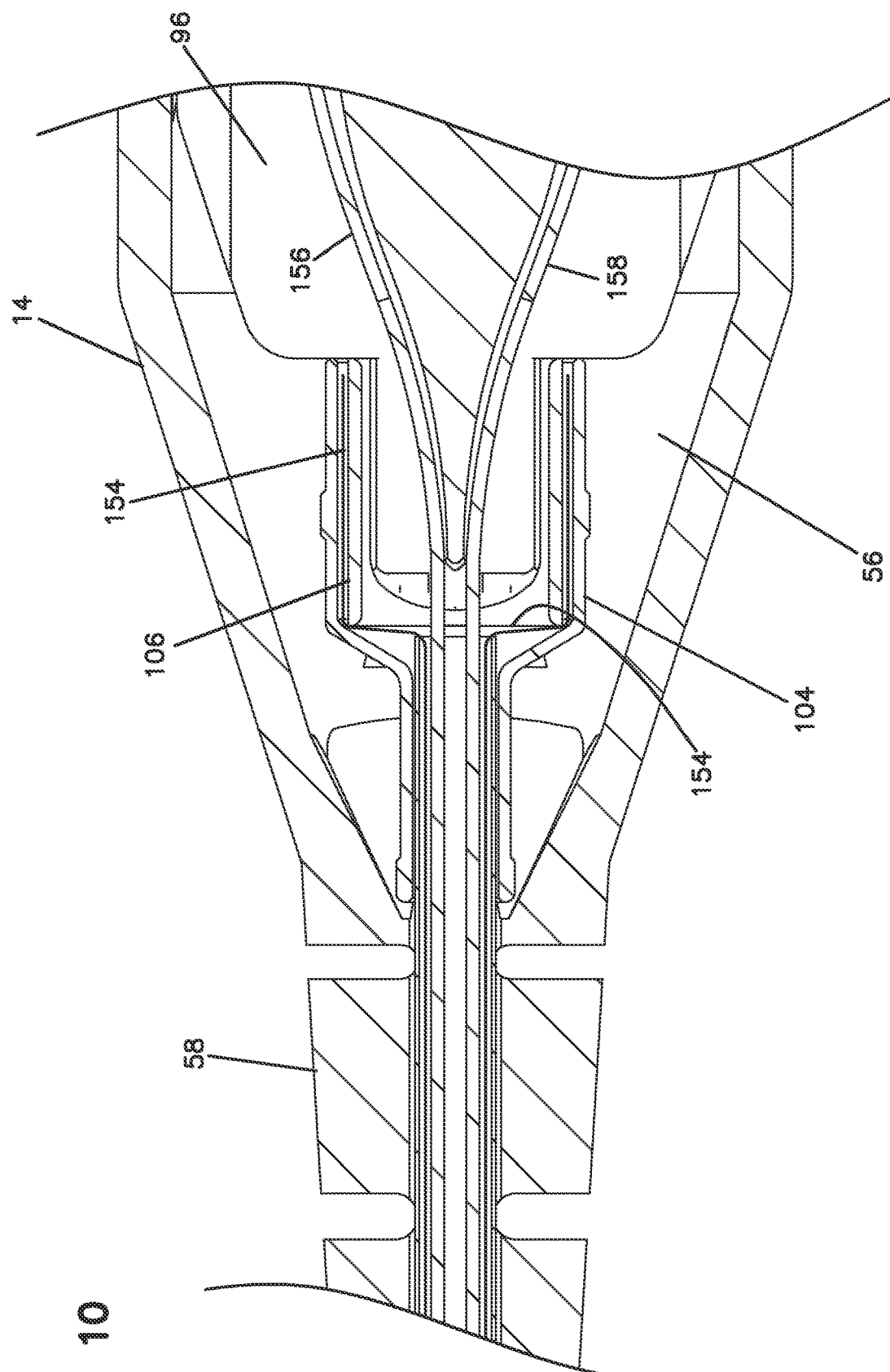
FIG. 10 is an enlarged view of an intermediate portion of the connector of FIG. 8.
Figure 11:
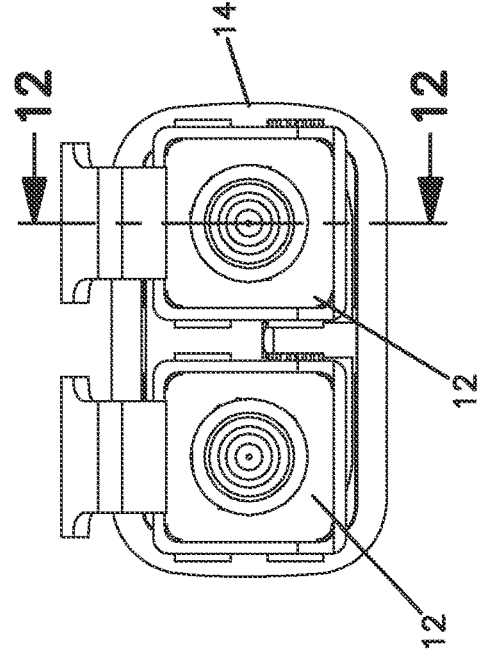
FIG. 11 is an end view of the connector of FIG. 1.
Figure 12:
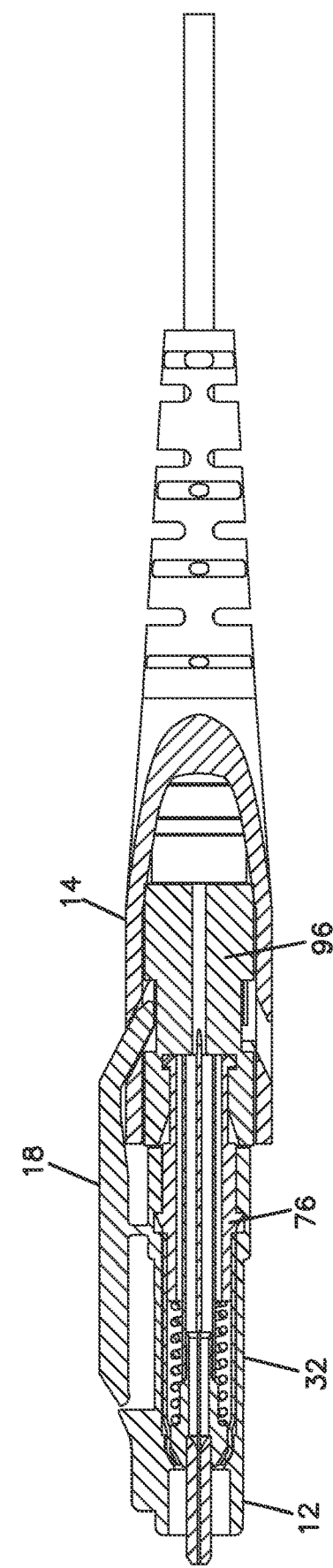
FIG. 12 is a cross-sectional view of the connector of FIG. 11, taken along lines 12-12.
Figure 13:
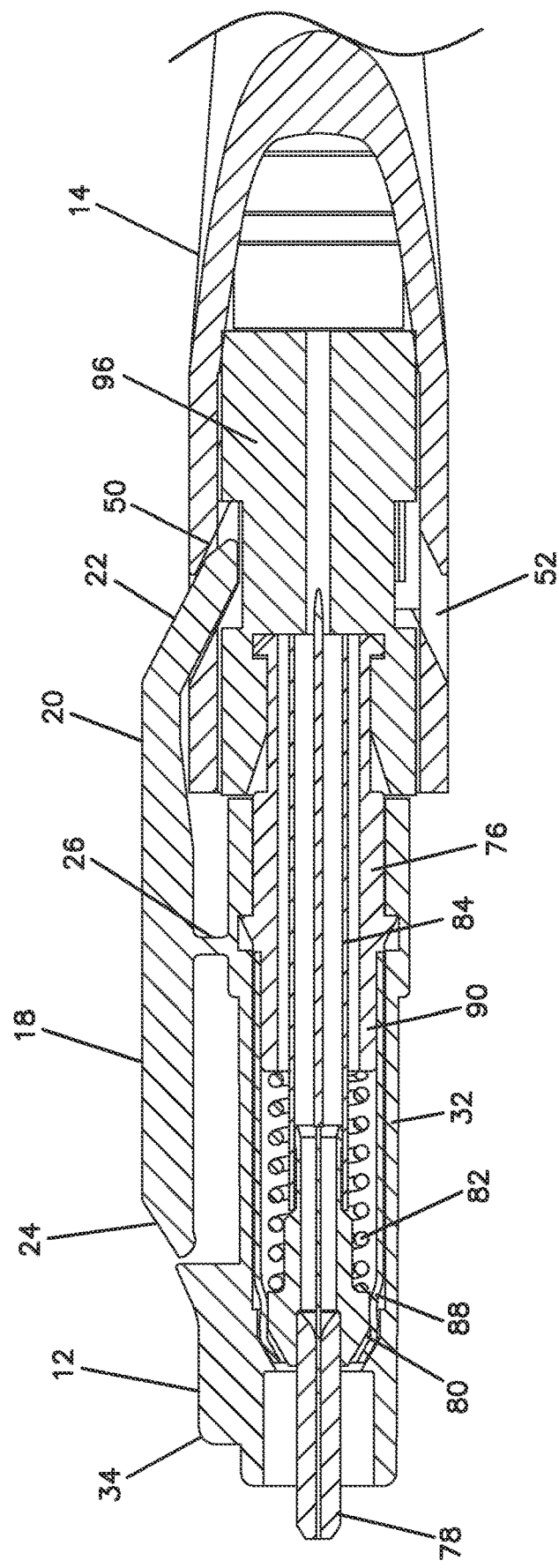
FIG. 13 is an enlarged view of a front portion of the connector of FIG. 12.
Figure 14:
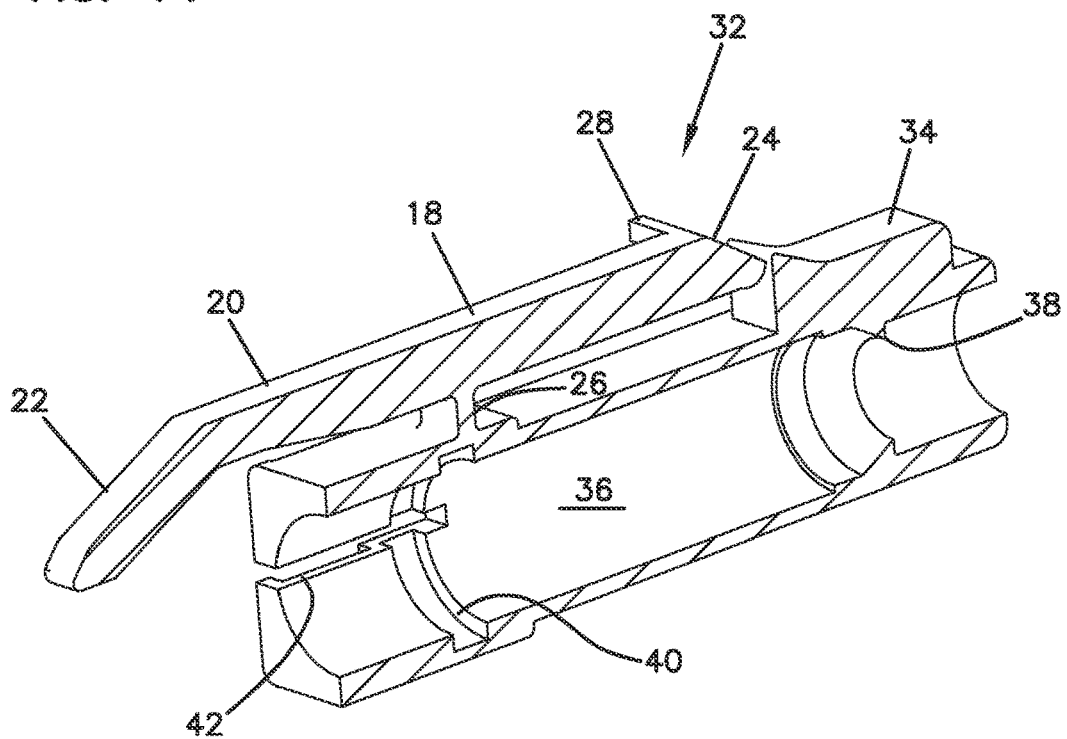
FIG. 14 is a rear perspective view in cross-section of the front housing of one of the connector portions.
Figure 17:
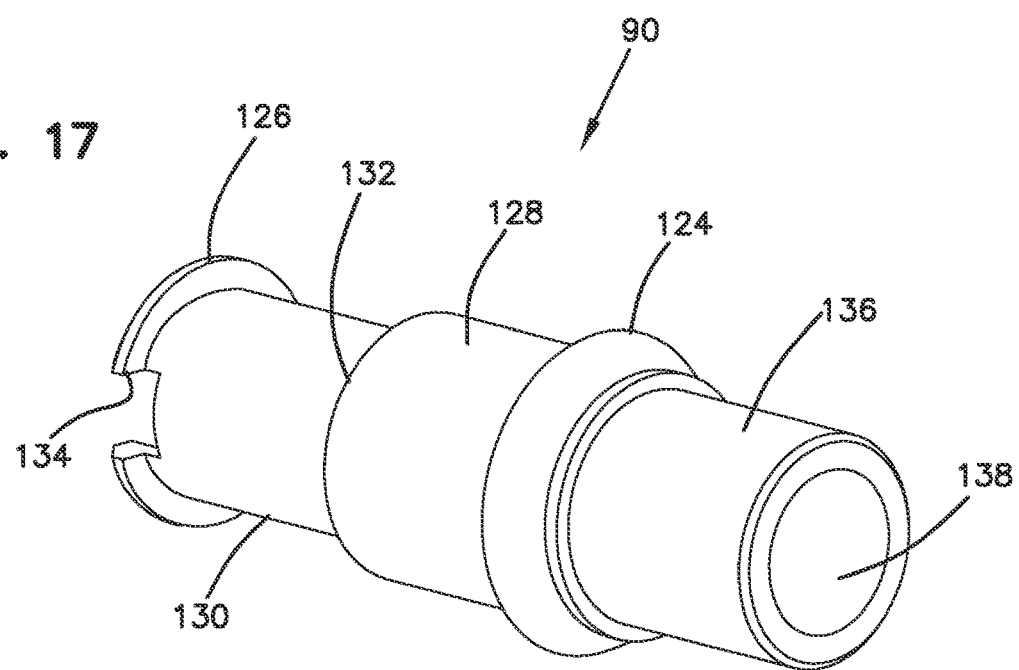
FIG. 17 is a perspective view of the rear sleeve of one of the ferrule assemblies.
Figure 15:
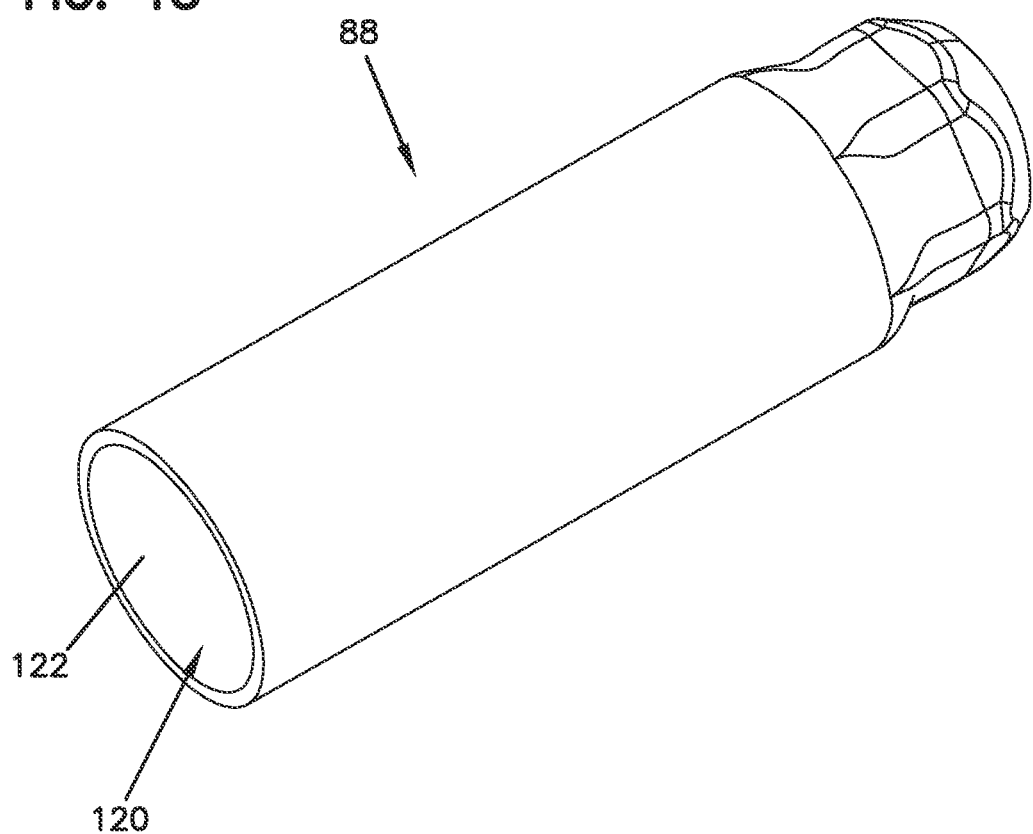
FIG. 15 is a rear perspective view of the front sleeve of one of the ferrule assemblies.
Figure 16:
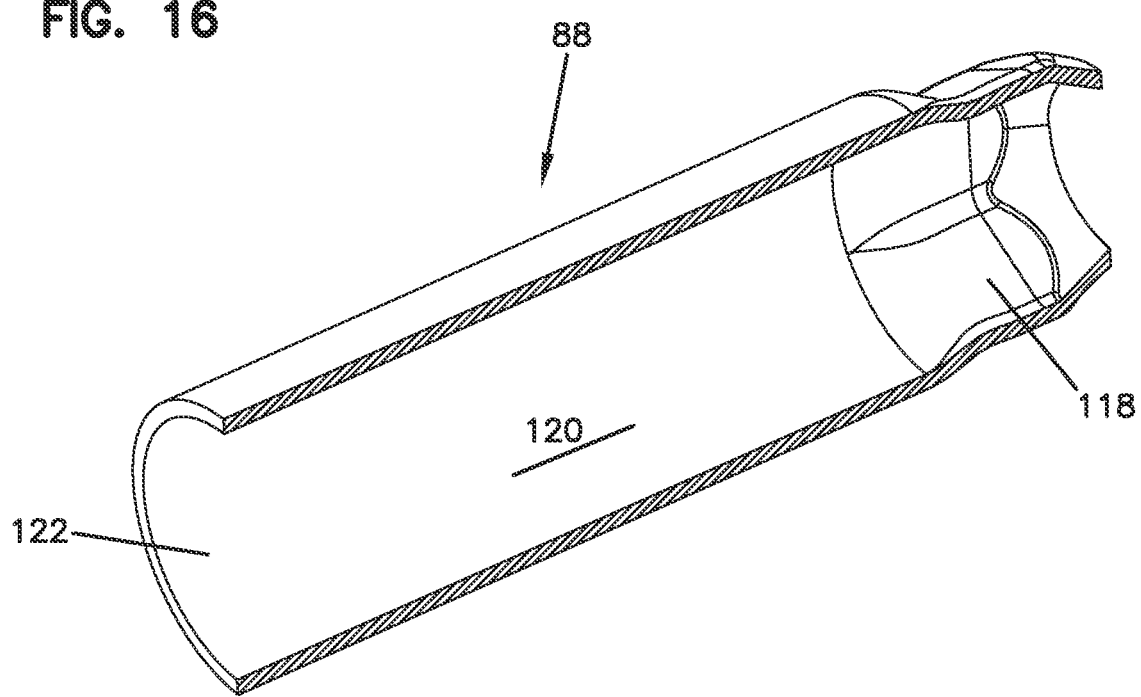
FIG. 16 is a rear perspective view in cross-section of the front sleeve of FIG. 15.
Figure 18:
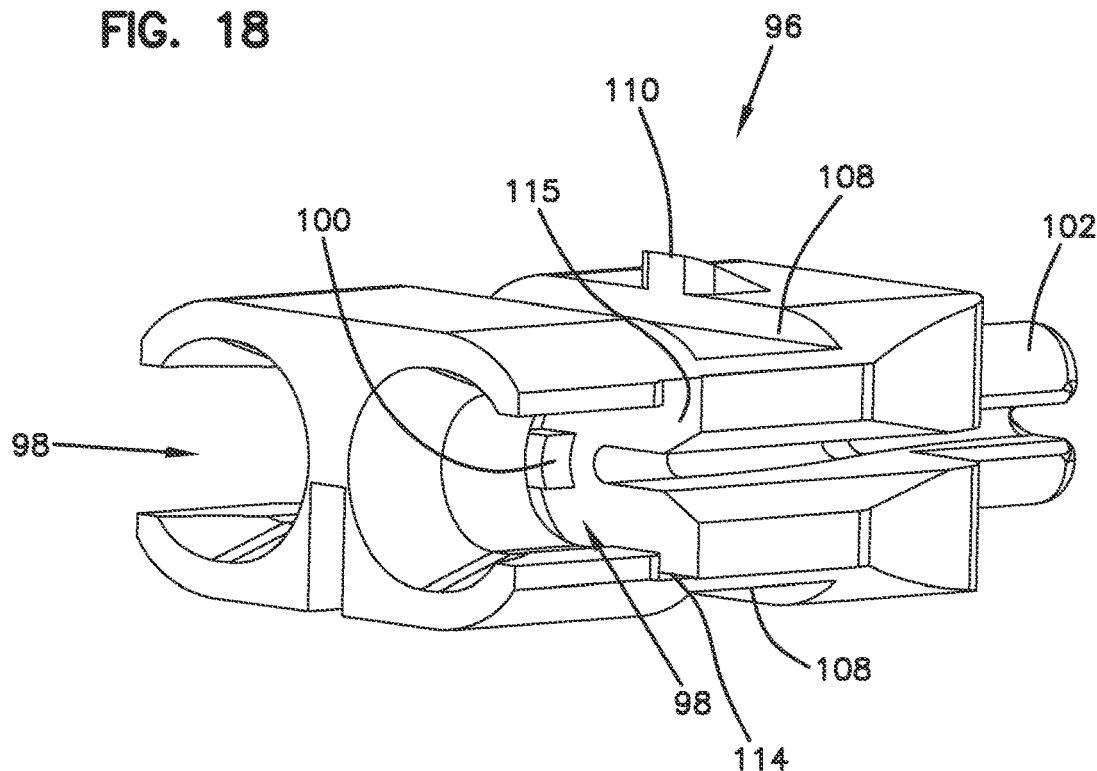
FIG. 18 is a front perspective view of the holder of the connector.
Figure 20:
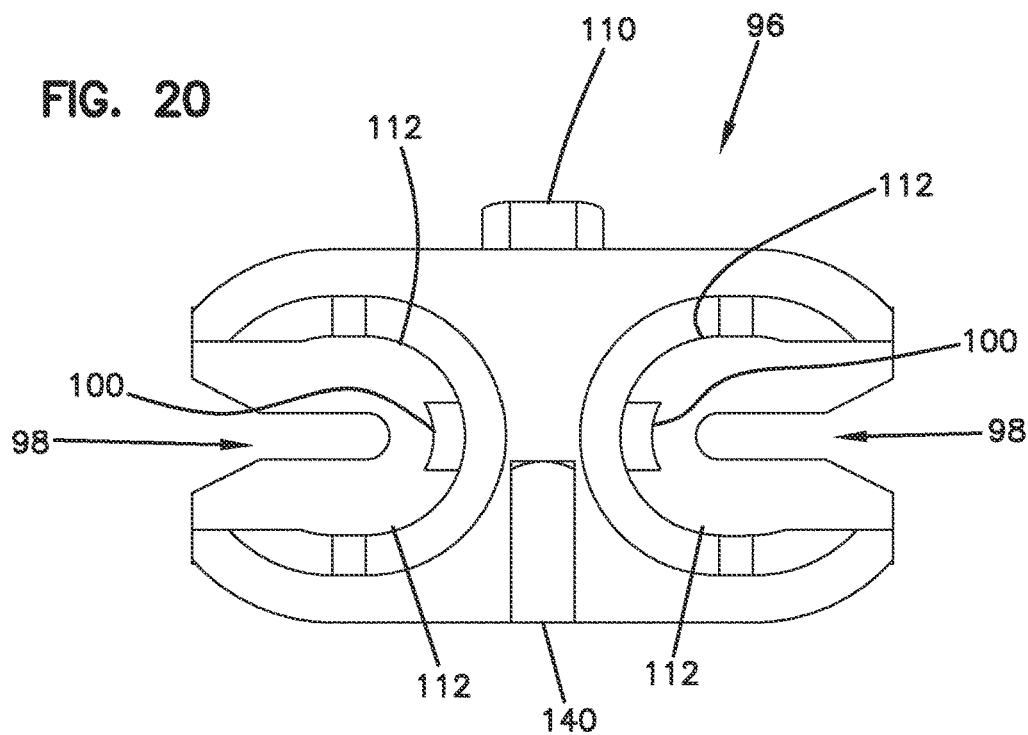
FIG. 20 is a front view of the holder of the connector.
Figure 19:
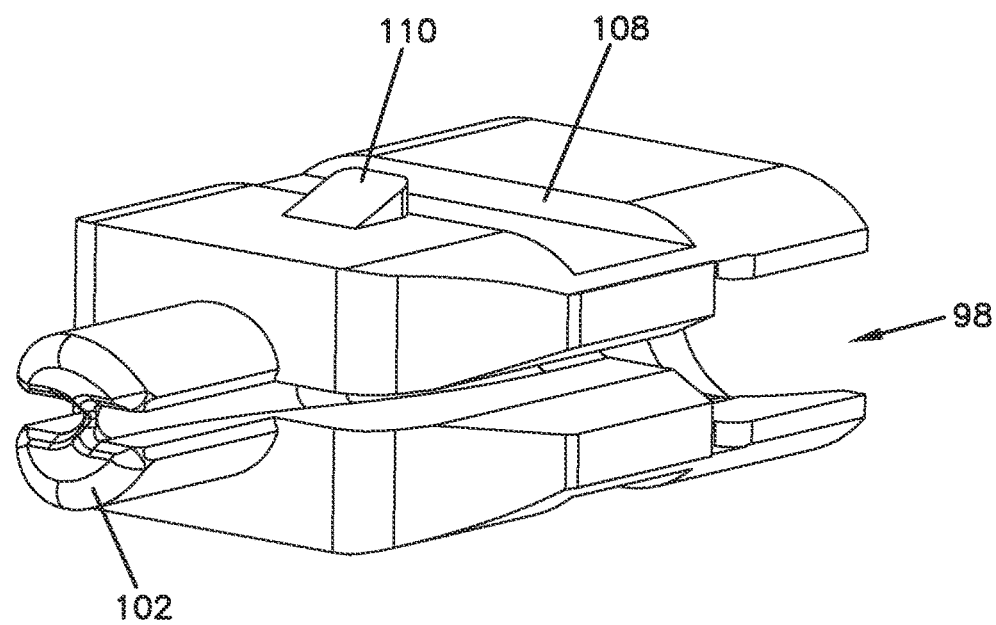
FIG. 19 is a rear perspective view of the holder of the connector.
Figure 21:
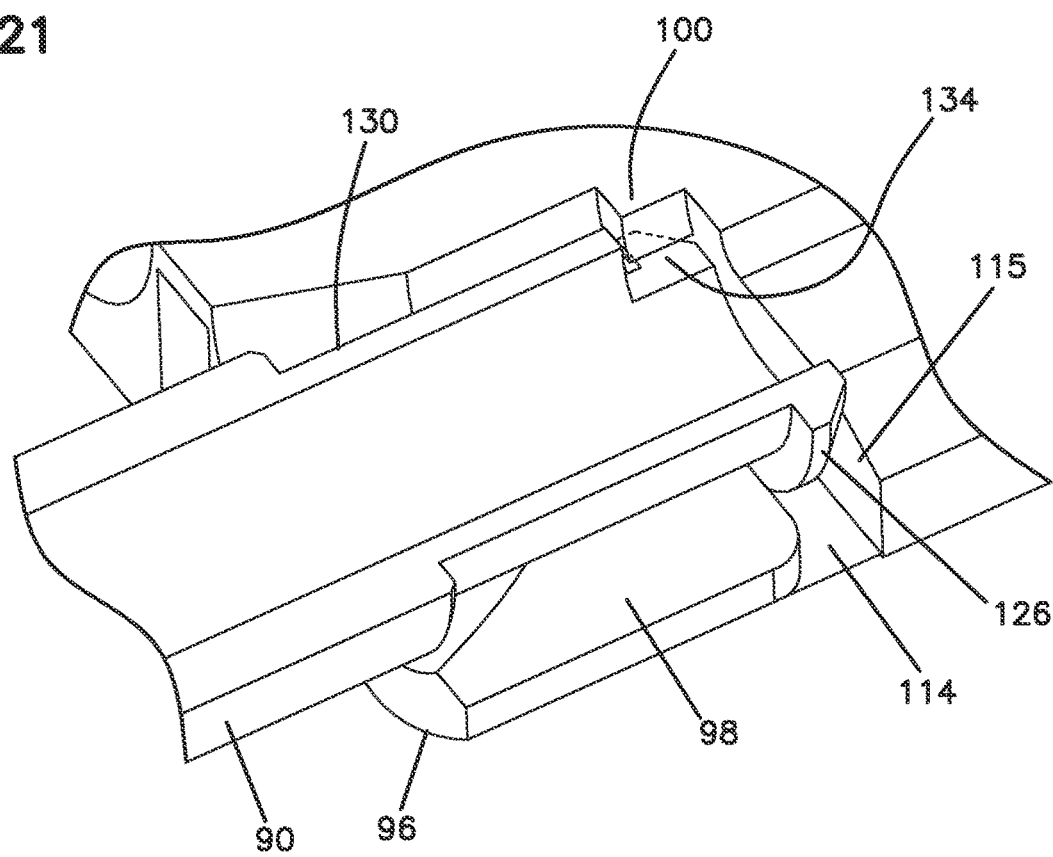
FIG. 21 is front perspective view in cross-section showing one of the rear sleeves mounted to the holder.
Figure 22:
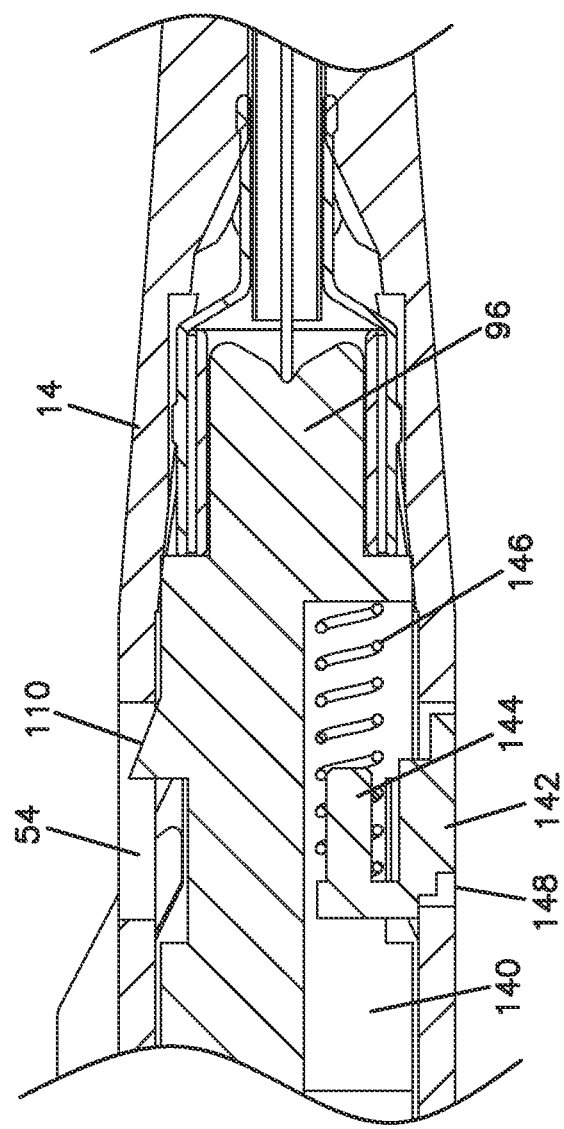
FIG. 22 is a cross-sectional side view of the connector along the centerline.

A clip 180 may be used to hold connector portions 12 in the desired position as shown in FIG. 1. If an alternative position of connectors 12 is desired, such as to reverse the polarity of the connector portions 12, clip 180 is removed, thereby allowing rotation of the front housings 32 with the latches to an opposite side of connector 10. Such operation is desirable to change the polarity of connector portions 12 with respect to boot 14. Once the front housings 32 are rotated, clip 180 is repositioned to maintain the front housings 32 in the new desired position. Boot 14 includes similar slots 52 on an opposite side of boot 14 so that boot 14 does not need to be rotated. Clip 180 can also be provided with different dimensions so as to change the spacing between connector portions 12, if desired. Clip 180 includes outer arms 182, and an inner arm 184, and shoulders 186 on each of arms 182, 184 for securing to front housings 32 of the connector portions 12.

In the illustrated example, front housing 32 mounts to ferrule assembly 76. Ferrule assembly 76 mounts to holder 96. Holder 96, which mounts to two ferrule assemblies 76, mounts to boot 14. Boot 14 is engageable with latches 18 of the front housings 32. Cable 150 is crimped to holder 96. The individual fibers of cable 150 are fixed to the ferrules 78, such as with epoxy.

Cable 150 includes an outer jacket 152, strength members 154, typically in the form of an aramid yarn, and two fibers 156, 158. Each fiber 156, 158 includes an outer coating 160 and a bare fiber 162. Typically, the coating 160 is removed and the bare fiber 162 is inserted into the ferrule 78, and affixed, such as with epoxy.

Front housing 32 includes a key 34 for mating with an inner passage 202 of adapter 200. Alignment sleeve 204 aligns the ferrules 78 to mate two connectors 10. Adapter 200 includes two ferrule alignment sleeves 204, and side-by-side passages 202 for each receiving a connector portion 12.

Front housing 32 includes latch 18 on an exterior, and an inner passage 36 in the interior for receiving ferrule assembly 76. Inner passage 36 includes a front shoulder 38, an inner slot 40 and a side slot 42.

Boot 14 includes an opening 54 for mating with structure on holder 96. Boot 14 includes an interior area 56, and a flexible rear portion 58.

Holder 96 includes a tab 100 for mating with structure on rear sleeve 90 of ferrule assembly 76. Holder 96 includes a rear projection 102 for receiving the crimp ring 104 and the crimp sleeve 106. Holder 96 includes cross slots 108 for receiving proximal ends 22 of latch 18. A shoulder 110 mates with opening 54 of boot 14 to allow longitudinal movement of boot 14 relative to holder 96. Side slots 98 lead to oval openings 112. Oval openings 112 allow for lateral movement of connector portions 12 to vary the lateral spacing. Oval openings 112 clip over ferrule assemblies 76 to retain the assemblies with holder 96.

Holder 96 is provided with a lateral slot 114, and a rear stop 115 for mating with rear sleeve 90 of each ferrule assembly 76.

Front sleeve 88 of ferrule assembly 76 includes a keyed surface 118 for mating with a keyed surface 116 of hub 80.

Inner surface 122 of front sleeve 88 is press fit onto outer surface 136 of rear sleeve 90. Rear sleeve 138 defines an inner passage 138.

Rear sleeve 90 includes a front collar 124 received in inner slot 40 of front housing 32. Rear collar 126 of rear sleeve 90 is received in slot 114 of holder 96. Outer surface 128 of rear sleeve 90 includes a reduced diameter portion 130, and a shoulder 132. Reduced diameter portion 130 is received in oval opening 112. Oval opening 112 retains rear sleeve as the side slot 98 is slightly smaller than reduced diameter portion 130. Notch 134 of rear sleeve 90 receives tab 100 of holder 96. Rear sleeve 90 and the rest of ferrule assembly 76 is prevented from rotating relative to holder 96.

To assemble connector 10, cable 150 is inserted through boot 14, crimp ring 104 and crimp sleeve 106. The fibers 156, 158 are affixed to the ferrules 78 of the ferrule assemblies 76. The ferrule assemblies 76 with the front housings 32 attached are mounted to the holder 96. The cable jacket 152 and strength members 154 are crimped to rear projection 106 between crimp ring 104 and crimp sleeve 106. Although crimp sleeve 106 is optional in some implementations. Boot 14 is pulled over holder 96 until shoulder 110 of holder 96 is retained in opening 54 of boot 14, and proximal ends 22 of the latches 18 are in one of slots 50, 52 of boot 14.

To switch polarity of connector portions 12, the front housings 32 are rotated in opposite directions so that the proximal ends 22 of the latches 18 are moved between slots 50, 52. During polarity switching, boot 14 remains mounted to housing 96. Clip 180 is removed during the polarity switching operation.

Front housings 32 with latches 18 can each be made as a one-piece element. Front housing 32 defines an LC profile for mating with ports 210 of adapter 200. As noted, front housings 32 are rotatable about the longitudinal axis of each connector portion 12 to change the polarity of the connector 10, without rotating the ferrule 78 or the ferrule assembly 76.

While the example connector 10 includes two fiber optic connector portions 12 and a boot 14, it is to be appreciated that connector 10 can include a single connector portion 12.

In some examples, clip 180 is not used. Clip 180 can be used to provide a certain spacing of connector portions 12. One spacing is sized at 6.25 millimeters. See Dimension D of FIG. 9. Another spacing that may be used is 5.25 millimeters. See Dimension C of FIG. 9. A different clip 180 with a different spacing may be used, or the clip may be not used for the closer spacing.

Boot 14 is shown as including a spring return feature. Pocket 140 of holder 96 receives a spring holder 142 including a peg 144. Spring holder 142 with peg 144 holds a return spring 146. Spring 146 biases boot 14 toward the forward position of FIG. 2 when released by the user. When the user pulls boot 14 longitudinally away from the connector portions 12, the spring 146 is compressed. Spring 146 moves the boot 14 back to the rest position of FIG. 2 upon release by the user. Pocket 140 of holder 96 is accessible through opening 148.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A connector comprising:
(a) a connector portion including a ferrule and a latch; and
(b) a boot mounted to the connector portion, the boot movable longitudinally relative to the connector portion, wherein the boot causes movement of the latch as the boot is moved away from the connector portion;
(c) wherein a front housing of the connector portion can be rotated about a longitudinal axis of the ferrule without rotating the ferrule or the boot, to change the polarity of the connector portion.

2. A connector comprising:
(a) an LC format connector portion including:
 i) a ferrule assembly including a ferrule and a hub mounted together, and a spring, the ferrule assembly including a front sleeve and a rear sleeve, the front and rear sleeves mounted together with an end of the ferrule protruding and the spring located in an interior area biasing the ferrule toward an extended position;
 ii) a front housing mounted to the ferrule assembly to form a front of the connector portion, and including a latch, the latch including a distal end, and a proximal end, wherein the latch is pivotable about an intermediate connection portion, wherein the distal end includes a shoulder for mating with a latching shoulder of an adapter;
(b) a boot mounted to the LC format connector portion, the boot movable longitudinally relative to the LC format connector portion, wherein the boot engages the proximal end of the latch and causes the distal end of the latch to pivot toward the ferrule of the LC format connector portion as the boot is moved away from the LC format connector portion, wherein the boot includes slots on both sides of the boot for receiving the proximal end of the latch, as the LC format connector portion is rotated to change polarity without rotating the boot.

3. The connector of claim 2, further comprising a boot return mechanism including a return spring for biasing the boot toward the LC format connector portion.

4. The connector of claim 2, wherein the front housing including the latch is a one-piece housing.

5. A connector comprising:
(a) a connector portion including:
 i) a ferrule assembly including a ferrule and a hub mounted together, and a spring, the ferrule assembly including a front sleeve and a rear sleeve, the front and rear sleeves mounted together with an end of the ferrule protruding and the spring located in an interior area biasing the ferrule toward an extended position;

ii) a front housing mounted to the ferrule assembly to form a front of the connector portion, and including a latch, the latch including a distal end and a proximal end, wherein the latch is pivotable about an intermediate connection portion, wherein the distal end includes a shoulder for mating with a latching shoulder of an adapter, wherein the front housing including the latch is a one-piece housing, wherein the front housing including the latch defines an LC connector profile for receipt in an LC adapter;

(b) a boot mounted to the connector portion, the boot movable longitudinally relative to the connector portion, wherein the boot causes the distal end of the latch to pivot toward the ferrule of the connector portion as the boot is moved away from the connector portion, wherein the connector portion can be rotated about a longitudinal axis of the ferrule without rotating the boot, to change the polarity of the connector portion.

6. A connector comprising:

(a) a connector portion including:

i) a ferrule assembly including a ferrule and a hub mounted together, and a spring, the ferrule assembly including a front sleeve and a rear sleeve, the front and rear sleeves mounted together with an end of the ferrule protruding and the spring located in an interior area biasing the ferrule toward an extended position;

ii) a front housing mounted to the ferrule assembly to form a front of the connector portion, and including a latch, the latch including a distal end and a proximal end, wherein the latch is pivotable about an intermediate connection portion, wherein the distal end includes a shoulder for mating with a latching shoulder of an adapter;

(b) a boot mounted to the connector portion, the boot movable longitudinally relative to the connector portion, wherein the boot engages the proximal end of the latch and causes the distal end of the latch to pivot toward the ferrule of the connector portion as the boot is moved away from the connector portion, wherein the boot includes slots on both sides of the boot for receiving the proximal end of the latch, as the connector portion is rotated to change polarity without rotating the boot, and wherein the boot includes ramps for unlatching the latch when the boot is pulled axially away from the connector portion.

7. The connector of claim 6, wherein the connector portion defines an LC connector profile for receipt in an LC adapter.

8. A connector comprising:

a connector portion including a ferrule and a latch, the latch including a proximal end, wherein the proximal end of the latch is pivotable in an upward direction away from the connector portion; and a boot including slots for the proximal end of the latch mounted to the connector portion, the boot movable longitudinally relative to the connector portion;

wherein the boot causes unlatching of the latch as the boot is moved away from the connector portion.

9. The connector of claim 8, wherein a front housing of the connector portion can be rotated about its longitudinal axis to change the polarity of the connector portion.

* * * * *